United States Patent [19]
Heller, Jr.

[11] Patent Number: 6,047,367
[45] Date of Patent: Apr. 4, 2000

[54] MICROPROCESSOR WITH IMPROVED OUT OF ORDER SUPPORT

[75] Inventor: Thomas J. Heller, Jr., Rhinebeck, N.Y.

[73] Assignee: International Business Machines Corporation, Armonk, N.Y.

[21] Appl. No.: 09/009,828

[22] Filed: Jan. 20, 1998

[51] Int. Cl.$^7$ .................................................. G06F 9/38
[52] U.S. Cl. ............................................ 712/23; 712/215
[58] Field of Search .............................. 712/200, 23, 215

[56] References Cited

U.S. PATENT DOCUMENTS

| | | | |
|---|---|---|---|
| 4,574,349 | 3/1986 | Rechtschaffen | 711/154 |
| 4,901,233 | 2/1990 | Liptay | 712/218 |
| 5,559,976 | 9/1996 | Song | 395/375 |
| 5,751,981 | 5/1998 | Witt | 395/380 |

*Primary Examiner*—Eric Coleman
*Attorney, Agent, or Firm*—Lynn L. Augspurger

[57] ABSTRACT

A system and method for improving microprocessor computer system out of order support via register management with synchronization of multiple pipelines and providing for processing a sequential stream of instructions in a computer system having a first and a second processing element, each of the processing elements having its own state determined by a setting of its own general purpose and control registers. When at any point in the processing of said sequential stream of instructions by said first processing element it becomes beneficial to have the second processing element begin continued processing of the same sequential instruction stream then the first and second processing elements process the sequential stream of instructions and may be executing the very same instruction but only one of said processing elements is permitted to change the overall architectural state of said computer system which is determined by a combination of the states of said first and second processing elements. The second processor will have more pipeline stages than the first in order processor to feed the first processor and reduce the finite cache penalty and increase performance. The processing and storage of results of the second processor does not change the architectural state of the computer system. Results are stored in its gprs or its personal storage buffer. Resynchronization of states with a coprocessor occurs upon an invalid op, a stall or a computed specific benefit to processing with the coprocessor as a speculative coprocessor.

11 Claims, 7 Drawing Sheets

MICROPROCESSOR WITH IMPROVED OUT OF ORDER SUPPORT

FIELD OF THE INVENTION

This invention is related to computer systems and in particular to a computer system with a microprocessor and coprocessor coupled to improve system performance and provide a microprocessor with improved microprocessor support.

BACKGROUND OF THE INVENTION

The performance of current microprocessors is severely limited by finite cache effects for a large fraction of important workloads. Finite cache effects include all contributors to performance degradation that would be eliminated if the first level cache of a microprocessor was made infinitely large. The amount of time that a microprocessor stalls while waiting for operand data from off chip storage is equal to the time spent executing instructions in many cases. This is especially true in workloads which involve database and transaction processing.

Many current microprocessor designs work towards reducing the finite cache penalty. Large caches, multiple levels of caching, high speed multichip modules, out of order execution and instruction prefetching have been widely used and are thought to be the most successful. Operand prefetching has also been successfully used for certain workloads with and without conventional out of order processing. However, operand prefetching is not particularly effective for database and transaction workloads. Large caches provide a reduction in finite cache effects but further improvements in this area are limited by the cost performance implications of increased die size or chip counts. Current out of order execution techniques provide large reductions in finite cache effects but they come with a penalty in the form of reduced processor clock frequency and increased design complexity. Thus there is a need to provide an improvement in microprocessor designs which can substantially reduce the cost of implementing out of order execution designs that were previously thought preferable.

GLOSSARY

CPI means machine cycles per instruction.

SFE is the speculative fetch engine provided by my current invention.

uPCore represents a microprocessor design that has been balanced for the trade-off of cycle time, design complexity and infinite L1 cache CPI.

SUMMARY OF THE INVENTION

My invention provides a way to design microprocessor systems which improves the out of order support and provides the ability to use large caches and multi-level caches with computer systems and in particular to a computer system with a microprocessor and a coupled coprocessor which provides a speculative engine for achieving a reduction in the finite cache penalty and thereby providing an increase in system performance.

The improvements of the preferred embodiment provide improved microprocessor support via register management with synchronization of multiple pipelines. These improvements are accomplished by providing a speculative fetch engine (SFE) having a plurality of execution elements acting in concert with a core microprocessor which processes instruction essentially in order (while enabled to handle superscalar techniques like fetching ahead and performing concurrent loads as needed) and a method for out of order execution, a method of synchronizing with a plurality of microprocessors, and a register management process enabling generation of speculative memory references to a storage hierarchy shared by both the SFE and microprocessor core (uPCore).

The uPCore and SFE are both considered processing elements. The system processes a sequential stream of instructions in a computer system having a first and a second processing element, each having its own state determined by a setting of its own general purpose and control registers When at any point in the processing it becomes beneficial to have a second processing element take over continued processing of the same sequential instruction stream then the first and second processing elements process the sequential stream of instructions and may be executing the very same instruction, but only one (in the preferred embodiment this is the uPCore) of said processing elements is permitted to change the overall architectural state of said computer system which is determined by a combination of the states of the first and second processing elements.

In the preferred embodiment the second processor will have more pipeline stages than the first in order processing element to enable out of order execution and thereby reduce the finite cache penalty and increase performance. The processing and storage of results of the second processing element does not change the architectural state of the computer system in the preferred embodiment. Results are stored in its general purpose registers or in its personal storage buffer. Resynchronization of the states of the two processing elements occurs upon an invalid op, a stall or a computed specific benefit to processing with the coprocessor as an out-of-order coprocessor (SFE).

The SFE interfaces with the uPCore and therefore the invention is more easily implemented with the SFE and first processor uPCore on the same silicon chip. Multichip implementations are also possible and are consistent with the current embodiment of the invention. The uPCore has traditional structure and maintains in the preferred embodiment the architectural state of the combined system, while in a generalized mirror version the responsibility for maintaining the architectural state alternates or is shared by both. Actions invoked by the SFE do not directly, in the preferred embodiment, alter the architectural state of the uPCore. The SFE is used to generate storage references that prime the caches of the combined system with instruction and operand data in advance of their use by the uPCore. These improvements extend system performance enabled by the prior register renaming schemes, such as those developed in U.S. Pat. No. 4,901,233 (hereafter Liptay) and U.S. Pat. No. 4,574,349.

These and other improvements are set forth in the following detailed description. For a better understanding of the invention with advantages and features especially over the widely implemented prior design first developed at International Business Machines Corporation, refer to the description and to the drawings described below.

BRIEF DESCRIPTION OF THE DRAWINGS

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Figure 1A:
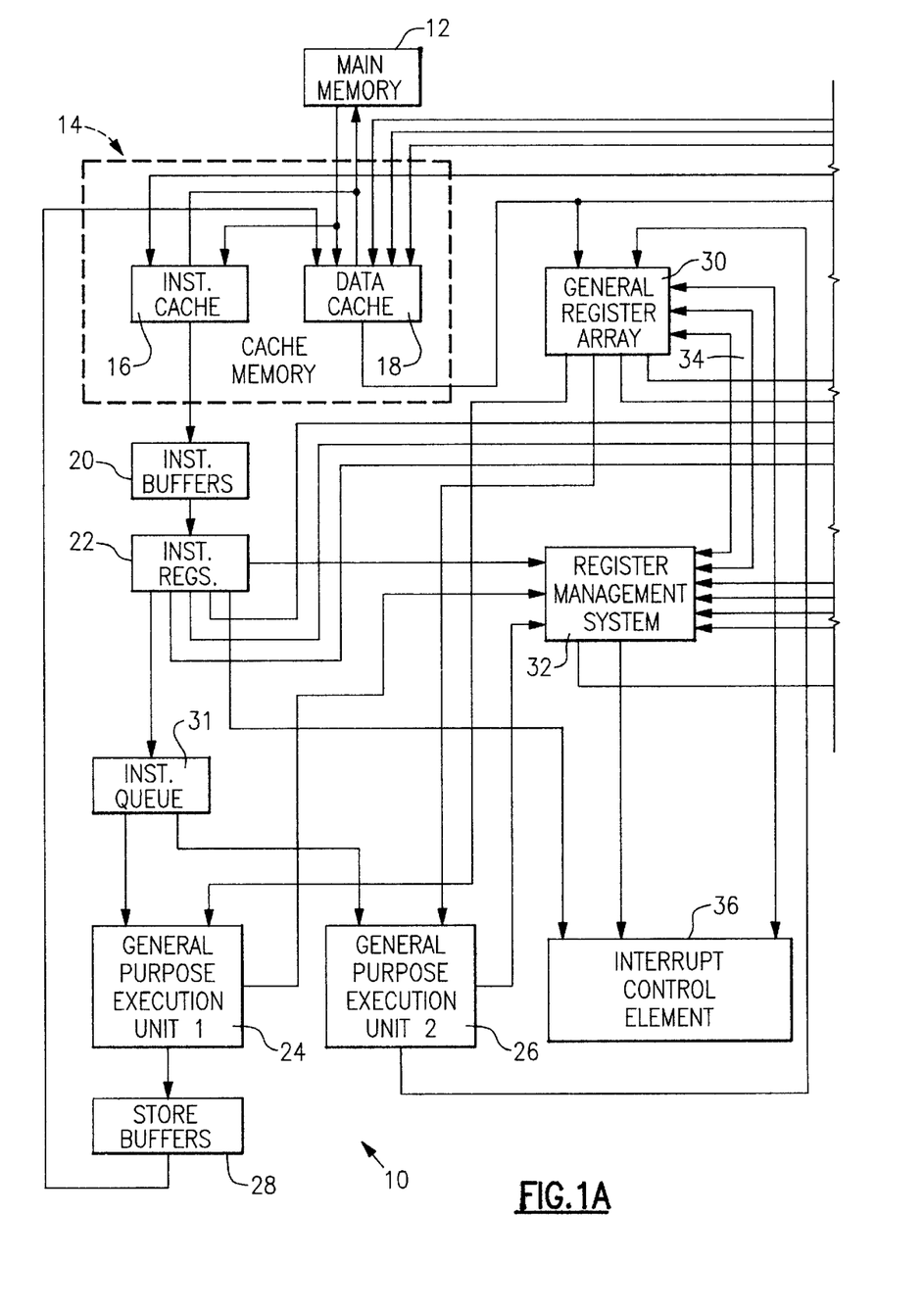
FIG. 1A and 1B provides the same description as provided by the IBM's Liptay U.S. Pat. No. 4,901,233 for illustrating the limitations of this prior effort which has been widely used in IBM's traditional mainframes and in microprocessors such as Intel's Pentium microprocessors, Digital's Alpha and Sun Microsystem Inc's UltraSparc microprocessors after the IBM development.
Figure 1B:
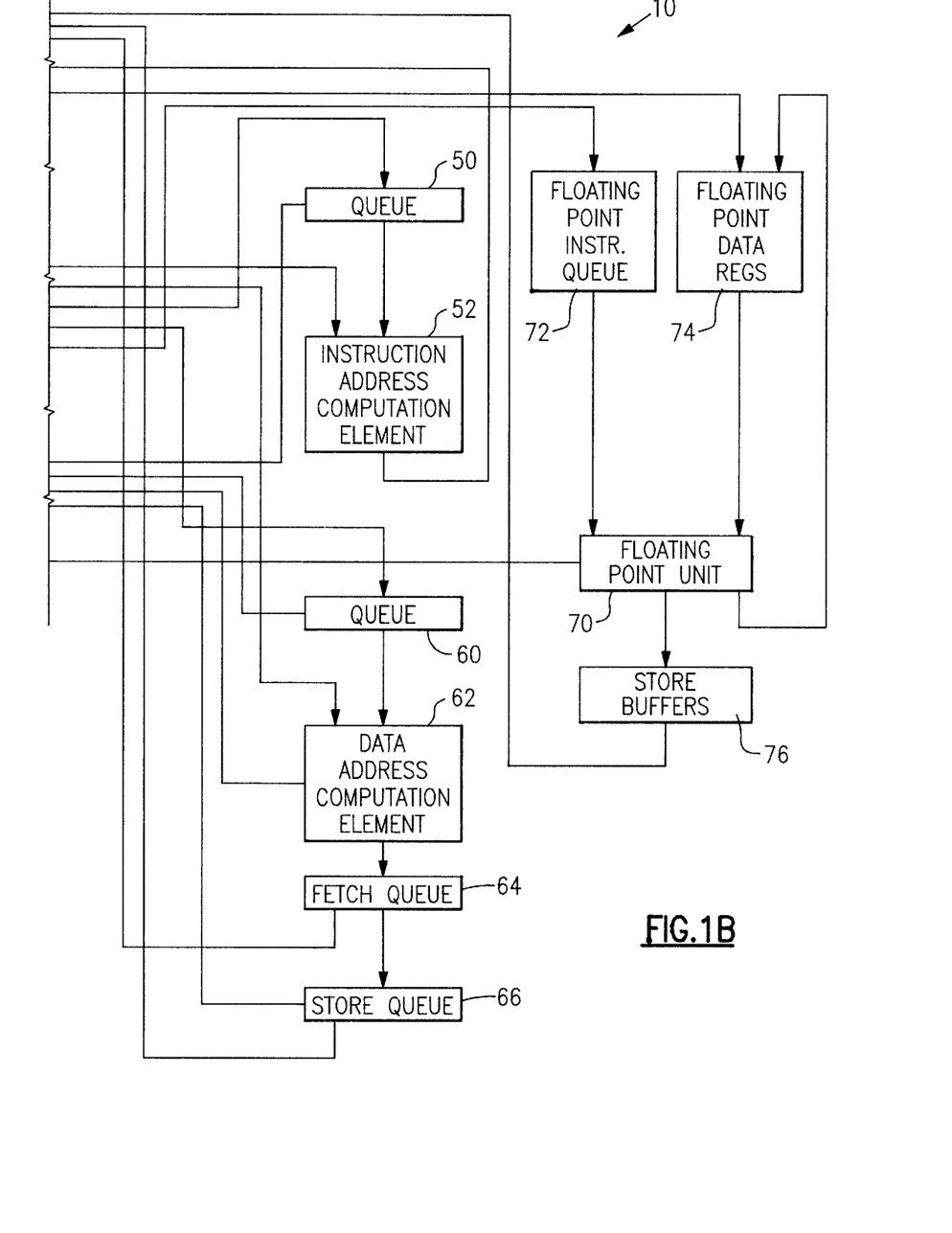

Before considering my preferred embodiments in detail, it may be worthwhile to illustrate, by way of example, a typical prior art out of order microprocessor design first developed within IBM and described in the Liptay patent, U.S. Pat. No. 4,901,233. FIG. 1 shows such a typical prior art out of order microprocessor design, originally described in U.S. Pat. No. 4,901,233, which teaches the use of a register management system (RMS). The RMS enables both the ability to use more physical registers for general purpose than are named in the architectural system and for precise post-branch recoveries. The use of a register management system is essential for enabling out of order execution. It is recognized that out of order execution provides significant reduction in the finite cache penalty which is the focus of the current invention. The preferred embodiment described in U.S. Pat. No. 4,901,233, includes modifications to the basic pipeline of prior-art in-order processor designs. These modifications are required to integrate the RMS into the overall system and result in an instruction pipeline that is either longer, i.e. more stages, or which contains more logic per stage than the instruction pipeline of an in order design. The preferred embodiment of U.S. Pat. No. 4,901,233 enables an improvement in both the infinite L1 cache CPI and finite cache CPI over previous in-order designs. The current invention does not preclude the use of out of order techniques to improve the infinite L1 CPI but allows their use to be limited in order to achieve better balance between design complexity and out of order support in the main instruction execution pipeline. The current invention focuses on the use of out of order techniques to reduce the finite L1 CPI adder without any increase in the uPCore pipeline length or the length of each stage in the pipeline. The overall result is greater system performance than U.S. Pat. No. 4,901,233 since the improved cycle time provides more performance than the small improvement in infinite L1 cache CPI provided by U.S. Pat. No. 4,901,233 in the case of database and transaction workloads. In addition the current invention allows for a large reduction in design complexity for all issues related to out of order instruction processing by isolating the register management system from the main instruction processing pipeline in the case where the uPCore is implemented as an in order design. With this review, I will describe FIGS. 1A and 1B as implemented by U.S. Pat. No. 4,901,233.

The Liptay invention was a register management system for a computer system having an architectural design requirement of a specified plurality of addressable (logical) registers such as general purpose registers, for example, n general purpose registers. Many of the elements of the Liptay design will be used in my system as I will describe. A register array (RA) having m registers, where m is greater than n, is provided to fulfill the functions of the n general purpose registers. As an illustrative embodiment, a system according to the well known IBM System/370 Architecture having 16 GPR's was described in U.S. Pat. No. 4,901,233, and this system is still employed in current S/390 machines even today. The RA provides dynamic assignment of particular RA positions to fulfill the functions of the architectural registers. When the function of a particular register assignment is completed, the position in the RA is released and may be reassigned as the same or another architectural GPR in due course.

Figure 2:
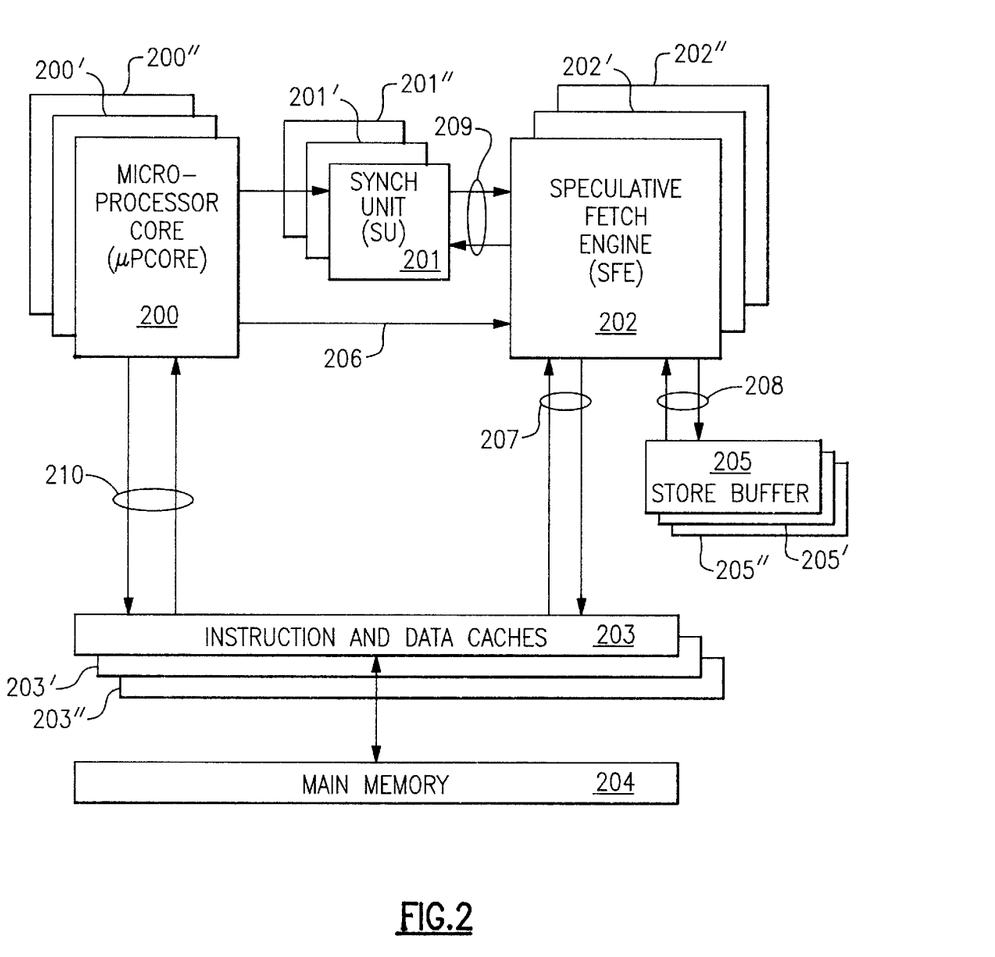
FIG. 2 shows schematically an overview of the preferred embodiment.

The register management system is not dependent upon the overall computer architecture and may be implemented in a variety of environments, just as it has been used in current microprocessor designs. Thus, whether it be a mainframe processor or a microprocessor, a computer system 10, shown in FIGS. 1A and 1B, accordingly has a main memory 12 connected with a cache memory system 14. The cache memory system 14 may be organized in any number of acceptable ways but is shown in the present example with an instruction cache 16 and a data cache 18 both connected to main memory 12 for separate handling of instruction operations and data operations, respectively. A hierarchical memory design to provide a cache memory with more than one level to provide both the advantages of memory speed and memory size in a cascaded arrangement and such a memory design, although not shown in FIG. 1A and 1B, is consistent with my present invention, as illustrated in FIG. 2.

As in FIG. 1A and 1B instructions pass from the instruction cache 16 through an instruction buffer unit 20 to an instruction register unit 22. For illustrative purposes, the instruction register unit 22 has more than one separate instruction registers, and two, three or four are desirable numbers of such instruction registers.

The general purpose units which function as execution units may be designed along the lines of the type of function performed, arithmetic or logical, scalar or vector, scalar or floating point, etc. Because any such arrangement of general purpose execution units makes use of general purpose registers (GPRs), this invention is applicable to many variations in the number, function arrangement and design of the general purpose execution units in a computer.

For purposes of illustration, the Liptay system was shown with general purpose execution units (GPE) 1 and 2, labeled 24 and 26, respectively. General purpose unit 24 has its output connected to a store buffer unit 28 which in turn has its output connected to data cache 18. General purpose unit 24 may actually be a single execution unit or a combination of units and, as shown in this embodiment, unit 24 produces results which go to store buffer 28 where they are held until instruction completion and then may be stored in memory. General purpose unit 26 has its output connected to a general register array (RA) 30, according to the present invention.

GPE 26 operates on instructions which produce results which are required to be available in registers rather than immediately stored. An instruction stack or queue 31 is provided to receive instructions from the instruction register unit 22 and direct them appropriately to GPE 24 or 26. Multiple execution units of various types may be used with a single RA and register management system. RA 30 contains 32 dynamically assignable real (physical registers to fulfill the functions of 16 GPR's recognized by the architecture.

The RA 30 is controlled by and provides status information to the register management system (RMS) 32 through a control bus 34. The RMS 32 is connected to several other systems in order to receive and provide various types of status information. An interrupt control element 36 is connected to the instruction registers 22, the RMS 32 and the RA 30 to process the proper handling of interrupts and preserve the required status information.

The RMS 32 is connected to the instruction register unit 22 and GPE's 24 and 26 for the purpose of following instructions from issuance through execution and the assignment of registers for input operands and output operands.

The computer FIG. 1A and 1B has an instruction queue 50 connected to receive instructions from instruction register unit 22 and having an output to instruction address computation element (I-ACE) 52. I-ACE 52 is also connected to receive inputs directly from RA 30 and has an output connected to the instruction cache 16. Instruction queue 50 is connected to the RMS 32 to provide status information.

The computer of FIG. 1A and 1B has an address queue 60 connected to receive an output from the instruction register unit 22. The output of address queue 60 is connected as an input to data address computation element (D-ACE) 62. The other input to D-ACE 62 is from RA 30. D-ACE 62 is connected to RMS 32 to provide status information.

The output of D-ACE 62 is connected to address fetch queue 64 which, in turn, has a first output connected as an input to data cache 18 and a second output connected as an input to address store queue 66. Address store queue has an output connected to data cache 18 and has a connection with RMS 32 to provide status information.

The computer has a floating point arithmetic unit 70 which is also connected to the RMS 32 to provide status information. As will be explained, it is important to note that the RMS 32 can work with units and registers not associated with RA 30. For example, one RMS may work with more than one register array. To be more specific, one RMS may control two RAs which in turn may be connected with multiple execution units of the same or different types.

The inputs to floating point unit (FPU) 70 are provided by a floating point instruction queue 72 and by floating point data registers unit 74. Floating point instruction queue 72 receives its input from I-REG 22. Floating point data register unit 74 receives its input from data cache 18 and from FPU 70. The output of floating point unit 70 is connected to store buffer unit 76 which has its output connected as an input to data cache 18.

Turning now to my invention in greater detail, it will be seen that the system which I will describe is effective for use where large caches and multiple levels of caching can be provided as shown in FIG. 2. The invention improves upon the performance of existing caches and the speculative fetching will improve the miss rate for each level of cache. The total performance benefit should be measured against what could have been obtained if the on chip caches were increased by the silicon size of the SFE in many instances.

There are instances where this comparison is not necessarily valid, as is the case for the L1 cache since cycle time constraints, not area, are usually critical for L1 caches. Preliminary results show a potential of 15 to 20% performance improvement using a SFE that is approximately ¼ to ½ the size of a on-chip secondary cache.

FIG. 2 Preferred Embodiment

As illustrated in my preferred embodiment illustrated in FIG. 2 the interconnection of the elements is provided by various interfaces, such as those between the uPCore (200) and Synchronization Unit (SU 201), SFE (202), and Instruction and Data Caches (203). The cache memory system may be organized in any number of acceptable ways but is shown in the present example with a combined instruction and data cache 203 connected to main memory 204 of this hierarchical memory which provides a cache memory with more than one level (e.g. 203' . . . 203") to provide both the advantages of memory speed and memory size in a cascaded arrangement and such a memory design is consistent with the present invention. Split instruction and data caches are also consistent with the present invention.

Any number of uPCores 200 . . . 200' . . . 200" can be used together with any number of SFEs 202 . . . 202' . . . 202". A SFE can be associated with a single uPCore at any given time but can change association to any other uPCore after a synchronization function is performed. Each SFE is associated with one Store Buffer and one SU. For example, 201',202' and 205' are used together to provide the required SFE functionality. Any number of SFEs can be associated with a single uPCore at the same time. The preferred embodiment has a single SFE and a plurality of uPCores.

However, before getting more into the detailed hardware description of the preferred embodiment, an alternative and generalized embodiment can also be recognized in FIG. 2 where the uPCore can be alternatively acting. A generalized FIG. 2 duplicates the functions shown and discussed herein, but with architectural control alternating between 200,200', 200" and 202,202',202" with the same functions being performed as mirror image of what is described in detail.

The preferred embodiment is thus a specific preferred example of an alternative generalized embodiment wherein the first conventional processing element uPCore 200, 200', 200" and second processing element SFE 202, 202', 202" act in concert while alternatively having control of the architectural state of the machine. In our preferred embodiment as illustrated in FIG. 2 the first processing element has control of the architectural state, processing most instructions of the sequential instruction stream in order. Thus generally, the method for processing a sequential stream of instructions in a computer system having a first and a second processing element, where each of the processing elements has its own state determined by a setting of its own general purpose and control registers, starts with directing an initial instruction of said sequential stream of instructions to a first one of said processing elements, e.g. 200. The processing said sequential steam of instructions continues using the first one of said processing elements which forwards forward any changes in the architectural state of the computer system to said second processing element. However, when at any point in the processing of said sequential stream of instructions by said first processing element, for example the uPCore 200, it becomes beneficial to have said second processing element, e.g. SFE 202, begin continued processing of the same sequential instruction stream then, the computer system's second processing element restores the state that was forwarded and begins continued processing of the same sequential instruction stream by processing the sequential instruction stream with the second processing element.

Then this second processing element forwards any changes in the architectural state of the computer system required by the first processing element to the first processing element.

With both the alternating control alternative embodiment and our preferred embodiment, the first and second processors may be executing the very same instruction but only one of said processing elements is permitted to change the overall architectural state of said computer system which is determined by a combination of the states of said first and second processing elements. In our preferred embodiment this combination will be determined by the first processing element. The action of the second processing SFE does not change the system's architectural state, in the preferred embodiment, even though in the alternative embodiment, the system's architectural state could be determined entirely or in part by the states of the second processing element. The finite cache penalty is reduced in the preferred embodiment when the uPCore pipeline handles most all the sequential instructions in order while the SFE preprocesses instructions for the use of priming the caches shared by the uPCore and SFE, resynchronizing as often as possible with the uPCore which has control of the architectural state while the SFE is preprocessing instructions as the SFE's results are stored in a separate personal store buffer.

In the alternating control embodiment, while not true of the preferred embodiment, the control of the architectural state switches back and forth.

In the generalized method, still each of said processing elements having its own state determined by a setting of its own general purpose and control registers, and still each of the first and second processing elements during said processing of said sequential stream of instructions may be executing the very same instruction but only one of said processing elements and only one is permitted to change the overall architectural state of said computer system which is determined by a combination of parts of the states of said first and second processing elements, but the one that controls the architectural state can change from the first processing element to the second processing element and from the second processing element back to the first processing element. This process would still be processing the sequential stream of instructions using said first one of said processing elements to start with while forwarding any changes in the architectural state of the computer system required by the second processing element to said second processing element, and accumulating these forwarded changes for use for the architected state for said second processing element at a future time. Then and when at any point in the processing of said sequential stream of instructions by said first processing element it is determined that it becomes beneficial to have said second processing element take over continued processing of the same sequential instruction stream then, the second processing element restores the accumulated architected state that was previously forwarded from said first processing element and takes over continued processing of the same sequential instruction stream by processing said sequential instruction stream with said second processing element. While the second processing element has control of processing of the sequential instruction stream it forwards any changes in the architectural state of the computer system required by the first processing element, to the first processing element for accumulation and use of said changes for the architected state to be used at a future time. Then control can change again, when at any point in the processing of said sequential stream of instructions by the second processing element it becomes beneficial to have the first processing element resume control and take over continued processing of the same sequential instruction stream then, the first processing element restores the accumulated architected state that was previously forwarded from said second processing element and takes over continued processing of the same sequential instruction stream by processing said sequential instruction stream with the first processing element.

Now the first processing element and second processing element can function as a multiprocessor. Also, as illustrated with 200, 200' and 200", the first processor can include a plurality of first processing elements which function as a multiprocessor with a single SFE, or with multiple SFE's. However, multiple SFEs would not be used with a single uPCore. That is to say, a multiprocessor can function with a combination of a set of one or more first processing elements and at least one second processing element. In our preferred embodiment, synchronization capability in the form of one synchronization unit SU 201, 201', 202" is provided for each of the second processing elements. This SU determines when the second processing element SFE 202, 202' and 202" starts to process the same instruction that's being processed by a first processing element uPCore with which it processes the instruction stream. Thus one synchronization unit is provided for each SFE and the SU determines when the SFE starts to process the same instruction or next instruction of the processing stream being processed by the controlling uPCore. The SU determines when the processing of instructions bu the SFE processing element should be stopped or ignored. This determination is made by a computed benefit determination for the entire computer system with inputs provided to the synchronization unit from the first and second processing elements. The inputs can be provided to the synchronization unit currently or from information stored in the system, as in FIG. 4 where the counters 407 and 408 provide the information.

Figure 7:
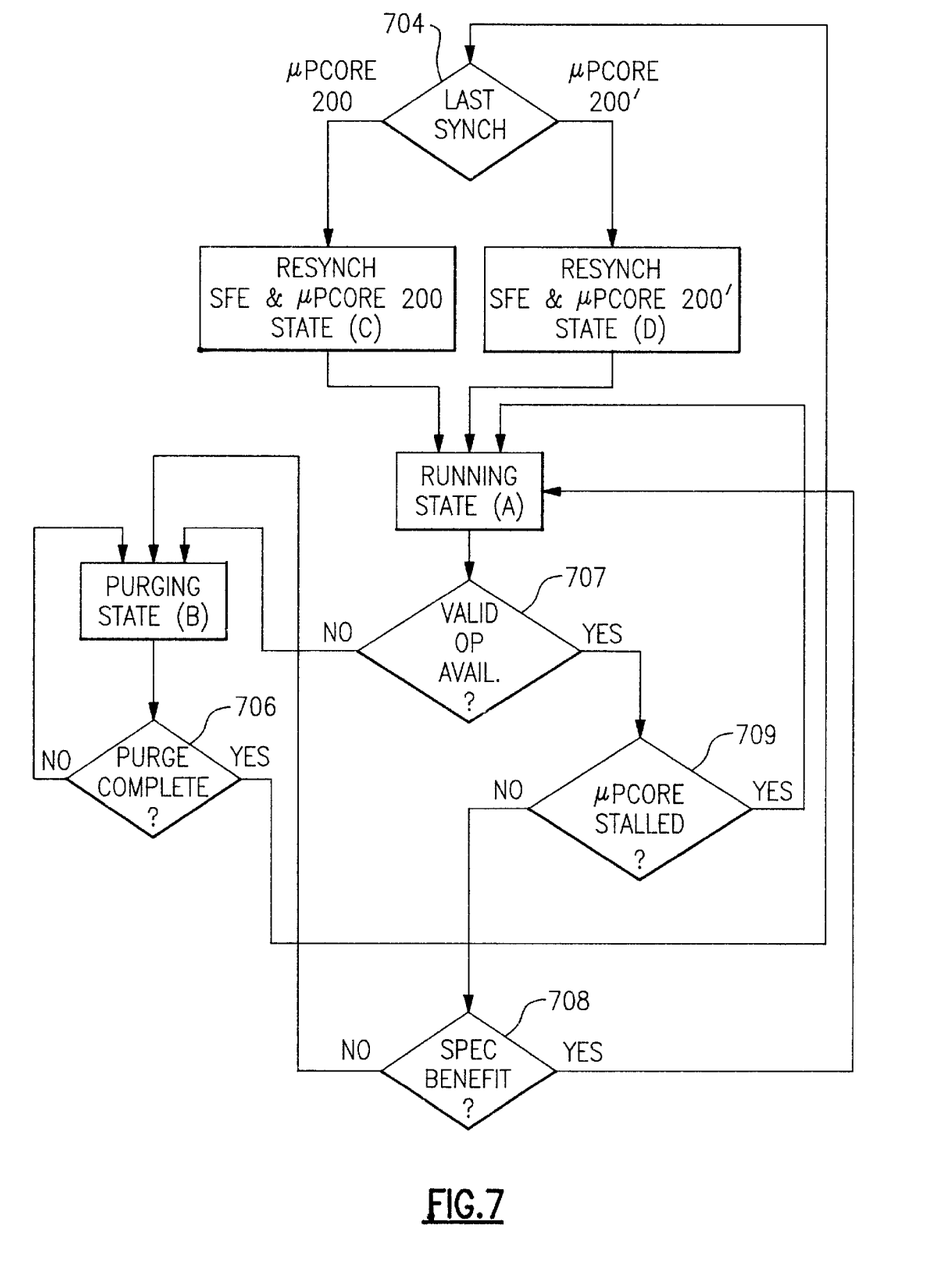
FIG. 7 shows in more detail the interaction of the speculative engine and microprocessor uPCore as a data flow chart to illustrate the methods I employ for improving performance.

When there is a stall determination as at 709 of FIG. 7 in processing of instructions by the first processing element the synchronization unit determines when the second processing element starts to process the same instruction that it is processing. When there is an operation that the second processing element is not designed to handle, i.e. no valid op is available (707), in processing of instructions processing element the synchronization unit determines when to resychronize the state of the second processing element with the architectural state of the computer system, in the preferred embodiment by resynchronization of the SFE & uPCore state. When there is a determination that the second processing element is not providing any benefit (the specific benefit determination 208) to the computer system in processing the instruction stream then the synchronization unit determines when to resychronize the state of second processing element with the architectural state of the computer system. All of the determinations illustrated in FIG. 7, 707, 708, 709, not only determination when there is to be a resynchronization performed by the synchronization unit, but also determines with which processing elements to resynchronize states. The processor preprocessing instructions, the SFE, stores its results in its own coupled personal gprs or store buffer 205, 205' or 205". As this storage does not affect the architectural state of the other processing element, these separate synchronizations allow the SFE to improve performance of the processor handling most of the instructions of the sequential stream, while the SFE can process the next instruction or same instruction of the processing stream being processed by said first processing element, and the SU can determine when the processing of instructions of said second processing element should be stopped or ignored. The first processing element fetches data from a data and instruction cache which is shared by said by both said first and second processing elements for the purpose of fetching.

This method of our preferred embodiment allows the SFE to be used to preprocess said sequential instruction stream for the purpose of priming the caches for the first processing element, handling the preprocessing as an out-of-order processor. During resynchronization and when the processing of instructions by said second processing element should be stopped or ignored the second processing element purges all results and partial results of preprocessing of the instruction stream for the first processing element before resynchronization.

Thus, it will be understood, that in our preferred embodiment the SFE, Synchronization Unit, and two (representing a plurality of) uPCores as well as personal store buffer(s) 205 for the SFE 202 are used in the method discussed above and illustrated in FIG. 7. The Synchronization Unit 201 contains the state of the SFE 202 as shown in FIG. 7. The allowable states are Running (A), Purging (B), Resynching SFE with uPCore 200 (C), and Resynching SFE with uPCore 200' (D). The initial SFE state is (C). In the state C the SFE receives the most recently retired instruction address from uPCore 200 in preparation for beginning out of order execution at that address. The Synchronization Unit 201 monitors successively with each uPCore functioning with an SFE the SU's interface with the uPCore for indication that the uPCore has stalled due to a cache miss. The uPCore is running and is continuously referencing cache storage and main storage over interfaces 210. Instruction and operand data is returned to the uPCore over the interface from the instruction and data caches 203.

The state change from Resynch to SFE Running (State A) occurs when the Register Management System of the SFE has loaded the contents of the SRAL associated with the uPCore into the DRAL of the SFE. Upon entering the SFE Running state, the SFE begins instruction fetching and execution at the instruction address most recently received over interface 206 from the uPCore. The GPR state of the SFE reflects the same state that the uPCore had upon the retirement of the instruction pointed to by the same instruction address. While the SFE is Running, the GPR results received over interface 206 continue to be written into the General Register Array, but the Register Management System associates them with a Synchronization Register Assignment List. They will only be used by instructions executed in the SFE after a synchronization event. In this manner, the SFE maintains a separate image of the GPR state of each uPCore that it is associated with, which it can access at a later time. Meanwhile, the RMS of the SFE uses only SFE execution results to update the image of the GPRs used for SFE execution of the instruction stream.

Just after the SFE enters the Running State, it will begin to execute out of order instructions while the uPCore continues execution at its own pace fetching its instructions from the cache 203 including those the speculative engine processing element SFEs storage references that are supplied to cache storage 203 of instruction and operand data in advance of their use by the uPCore conventional processing element. In the preferred embodiment the uPCore can be exclusively designed as an in order processor, or one optimized for in order processing or be one able to handle processing instructions of instructions where substantially less than 95% of all instructions will not benefit from prediction. Therefore it may experience a pipeline stall in the case of a L1 cache miss. The SFE may continue past the instruction which caused the stall since it is capable of out of order execution. During the time that the SFE is running it generates fetch references that are sent to both the Instruction and Data Caches over interface 207 and to the Store Buffers over interface 208. A cache miss is experienced if both the Caches and the Store Buffers do not have the desired data. Instructions and Operands are returned to the SFE over interface 207 in the case where there is no relevant entry in the Store Buffer, and are returned over interface 208 if there is a relevant entry in the Store Buffer. SFE store references are not sent to the Instruction and Data Caches and are instead sent to the Store Buffer. In this way, the results of SFE store instructions can be made available to subsequent instructions executed on the SFE without altering the architectural state of the uPCore and Caches. All SFE stores are kept in the Store Buffers.

The synchronization unit monitors the activity of the SFE via interface 209. If the SFE runs out of supported instructions to execute or encounters an interruption or exception that it is not designed to handle, or is otherwise not valid, this is indicated on interface 209. The Synchronization Unit then sends the SFE into the Purging state (B) in FIG. 7. The Synchronization Unit also monitors the progress of the uPCore's decoding of instructions and the SFE's retirement of instructions. If there are no more valid ops 707, or if it is determined that the SFE is not providing a speculative prefetching benefit 708, the SFE is assumed to have fallen too far behind the uPCore execution and is moved to the Purging state (B) in this case also. If the uPCore currently associated with the SFE is still stalled at decision point (709), the movement to the Purge state is blocked and the SFE continues in the Running state. Many other indications of the SFE benefit can be used for determining when the SFE should enter the purge state and are consistent with the current invention.

Once the SFE enters the Purging state (B) it does not leave this state until all instructions, parts of instructions and partial results have been cleared from the data paths and control structures of the SFE. No requests are sent to the instruction or data caches during this time. The SFE leaves the Purging state when this has been accomplished 706 and can move to one of two states C or D. The SFE can either resynchronize with uPCore 200 or with uPCore 200'. The choice 704 determined by the SFE between these two actions can be based on a variety of factors, all of which are consistent with the present invention. The preferred embodiment uses a simple indication of which uPCore was the last to have been synchronized with the SFE, in which case the SFE will use the other uPCore to do the synchronization. Using other algorithms it may happen that the same uPCore is chosen multiple times through the decision point 704. Once the resynchronization is complete, the state is changed back to running once more and the cycle begins again.

Speculative Engine (SFE)

Figure 3:
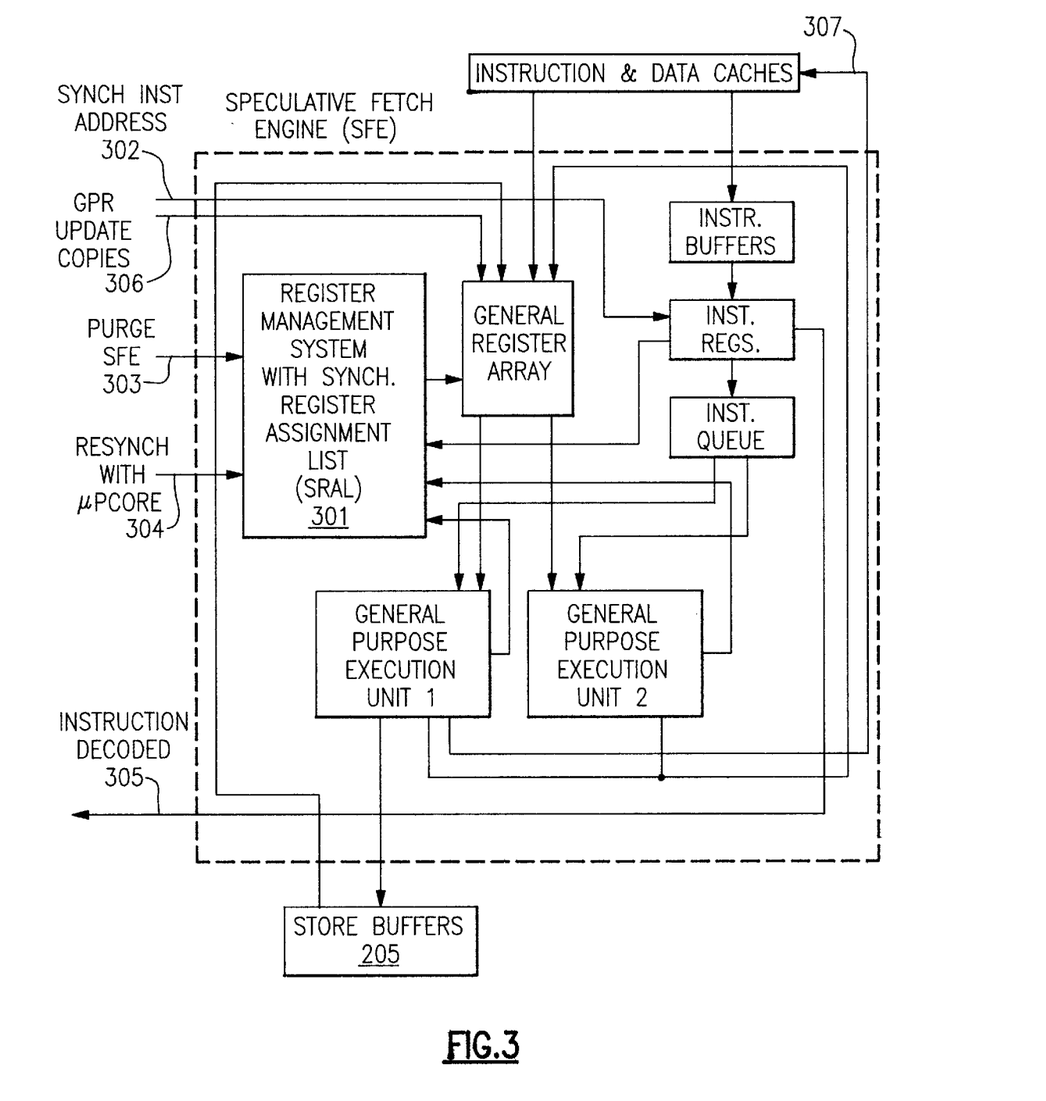
FIG. 3 illustrates the details of the SFE and the interfaces of the SFE to the store buffers, caches, uPCore. It also illustrates my preferred hardware for routing the instruction and operand fetches of the SFE through the caches shared by the SFE and uPCore.

The SFE uses conventional out-of-order processing and in addition employs certain functions or techniques which may be called superscaler techniques in order to generate speculative operand and instruction fetches. These techniques include register renaming, instruction reordering, completion scoreboarding etc. There are a wide variety of possible implementations of the SFE. The criteria for an optimal design will include cycle time and area constraints that are very different than current generation out-of-order designs. FIG. 3. illustrates the details of the SFE and its interfaces to the other elements of the system. This oversimplified diagram is meant to highlight the interaction of the novel register management system with the general register array and instruction processing pipeline. This is similar to FIGS. 1A and 1B, but there are important distinctions. First, there is an additional interface 306 which forms part of the interface 206 between the GPR and the uPCore. This interface is used to carry the updates of the uPCores GPRs to the SFE. The second is that the RMS 301 of the current invention has been modified to include the use of Synchronization Register Assignment Lists (SRALs). The third is that the stores to the memory hierarchy are sent to the Store Buffers 205 instead of to the Instruction and Data Caches as shown in Liptay et al. U.S. Pat. No. 4,901,233. In the SFE data flow does continue to pass in the manner shown in FIG. 1A and 1B from Liptay et al. U.S. Pat. No. 4,901,233 as illustrated in FIG. 3 to reach the store buffer 205.

Interfaces 302, 303, 304 & 305 comprise part of interface 209 and carry the synchronization address, purge indicator, resynchronization indication and decoded instruction indication respectively. The synchronization address is used by the SFE as the starting point for instruction fetching and execution immediately after the SFE has been resynchronized with the architectural state of a uPCore. The purge SFE indication causes the SFE to discard all instruction results and partial results and to purge the contents of the SFE's store buffers. The resynchronization indication is used by the SFE to determine which uPCore the SFE should synchronize with and when the resynchronization should be done. The SFE uses the instruction completed interface to indicate to the SU that an instruction has been successfully decoded. The SU uses this information in the determination of whether the SFE is providing speculative fetching benefit. The SFE sends instruction and operand fetch requests to both the instruction and data caches via interface 307 and to the store buffers over interface 308. The speculative fetches sent over interface 307 are made by the SFE in advance of when the uPCore will make the same fetch requests when it resumes execution after a stall. The uPCore will thereby experience an improved latency for these fetch requests since the desired line has been recently accessed and has been installed in the closest level of cache.

Since the SFE is independent of the architectural state of the uPCore the implementation of the out of order instruction processing is free of many architectural concerns. This leads to improved schedule and reduced impact to the cycle time of the overall design. The implementation risks associated with the SFE can now be completely decoupled from the uPCore. The SFE can be optimized for the generation of speculative fetches in a way that is not possible for a uPCore that needs to meet the needs of a large and varied instructions set. The SFE does not need to implement any infrequently used instructions, exception handling operations or recovery algorithms. In the case of any of these infrequent events the SFE will stop executing the instruction stream and indicate this to the synchronization unit. The uPCore will eventually leave the stalled state and if the infrequent event persists, will handle it with the much simpler approach of an in order design.

The SFE design must be optimized for decoding and issuing a large number of instructions quickly and not necessarily just for infinite CPI. The SFE can be designed with a longer instruction pipeline without as much consideration for the impact on infinite L1 cache performance as compared to prior designs. The infinite L1 cache performance of the overall system, both the SFE and uPCore together, depends only on the uPCore pipeline not the SFE.

With my design, operand prefetching needs not to be preformed by the uPCore, and use of the SFE system thus eliminates this feature and its associated complexity from the uPCore if desired. There are some cases where operand prefetching may need to be retained in the uPCore and this is consistent with the current invention.

Figure 5:
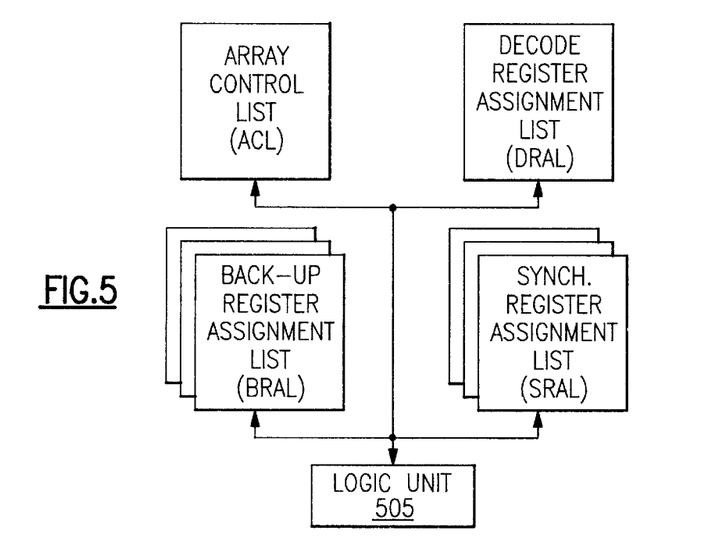
FIG. 5 shows in more detail the improvements to Liptay's register renaming invention to allow for the synchronization of the uPCore(s) and SFE.

The details of the innovative changes to the RMS are illustrated in FIG. 5 where in accordance with my preferred embodiment the SFE maintains a Synchronization Register Assignment List (SRAL) for each uPCore that is associated with the SFE. The register management system of the present invention, including the extension for use of SRALs, is not dependent upon the overall computer architecture and may be implemented in a variety of environments. Thus, without limiting the scope of the invention, the SFE shown in FIG. 3, according to the present invention, is described as according to the IBM System 390 Architecture has 16 General Purpose Registers (GPRs). The GPR Register Array (RA) together with the RMS provide dynamic assignment of particular register assignment of particular RA positions to fulfill the functions of the architected registers. When the function of a particular register is completed, the position in the RA is released and may be reassigned as the same or another GPR in due course.

RA contains 48 dynamically assignable real (physical) registers to fulfill the functions of the 16 GPRs recognized by the architecture in this embodiment of the invention. A Decode Register Assignment List (DRAL) is used when instructions are decoded to translate GPR assignments into RA assignments. As each instruction is decoded, the GPR's it references are looked up in the DRAL to determine what RA positions are assigned to the GPR's. and as new RA positions are assigned to receive results, the DRAL is updated to reflect these assignments. In this way, each instruction which uses a GPR is directed by the DRAL to find the RA position which is assigned to the most recent instruction to reference that GPR.

Back-up Register Assignment Lists allow the processing of one, two, or three conditional branches respectively, without waiting. It has the same structure as the DRAL, and is connected to it in such a way that in one cycle the entire contents of the DRAL may be copied into the BRAL, or vice versa. These transfers are controlled by the logic unit 505. It is used, for example, when a conditional branch is encountered to save the contents of the DRAL in case the guess as to whether the branch is taken is found to be wrong.

An Array Control List (ACL) is connected to receive status information and send control information from the RA and the rest of the SFE. Logic unit 505 controls the ACL and coordinates the operations of the ACL, DRAL and BRALs. For each of the RA's which support the GPR's there is an ACL register which remembers status information related to that RA. There is one entry for each register position of the array.

The addition of SRALs to the register management system is critical to the function of the SFE and therefore to the present invention. The SRALs have the same structure as the DRAL, and is connected to it in such a way that in one cycle the entire contents of the SRAL may be copied into the DRAL.

One SRAL is provided for each uPCore that the SFE is associated with. As a uPCore generates GPR and CR updates, they are forwarded over interface 206 to the SFE. The results can be delayed for a cycle in order to minimize cycle time impact to the uPCore. The GPR updates are written into the RA and the SRAL associated with the source uPCore is updated to point to the RA location. Since the uPCore in the current embodiment normally functions as an in order execution design, the GPR updates on interface 206 reflect the GPR updates for retired instructions and therefore can always be written to the same RA that the SRAL currently indicates. During a resynchronization operation, the SRAL must be provided with 16 new RA entries to ensure that the continuous updates from the uPCore can be accommodated. In the current embodiment this is not a problem since a resynchronization operation is always preceded by a SFE purge which frees all RA entries other than those associated with SRALs. The GPR state of the uPCores in the SFE copy in the SRAL is always a minimum of 1 cycle delayed. When the SFE needs to synchronize with the uPCore a simple movement of the SRAL contents into the DRAL accomplishes the task. This operation is analogous to Liptay's use of BRALs for the restoration of the microprocessor's state in the case of a mis-predicted branch.

The function of the present invention's SRALs differs from Liptay's BRALs in significant ways. The first is that the SRALs are written with GPR updates that are from another instruction processing pipeline as they may be for the uPCore.

The second is that the trigger for causing the movement of the SRAL contents to the DRAL is very different than that which causes the movement of the BRAL contents into the DRAL in Liptay. In Liptay, a mispredicted branch is the trigger. In the current invention an indication of no prefetching benefit is used as the trigger and thus it will be understood that U.S. Pat. No. 4,901,233 and its commercial embodiments are entirely different in the SRALs' function from the current invention. The BRAL cannot be used for this purpose and is used in this invention for the same function that it was introduced by Liptay, restoration of the processor state after the determination that a branch guess direction is wrong. The third important distinction is that when the SRAL contents are moved to the DRAL, every entry in the SRAL is immediately changed to point to 16 new RA positions. In Liptay, the BRALs are loaded directly from the DRAL in the case of the decoding of an unresolved branch.

More than one SRAL can be used to allow the SFE to synchronize to more than one uPCore. Two or more uPCores can use the same SFE to provide a prefetching benefit, although both cannot use the SFE at the same time. Each additional SRAL must be accompanied by the associated uPCore's GPR result busses for the purpose of synchronization and by an associated Store Buffer.

uPCore

Figure 6:
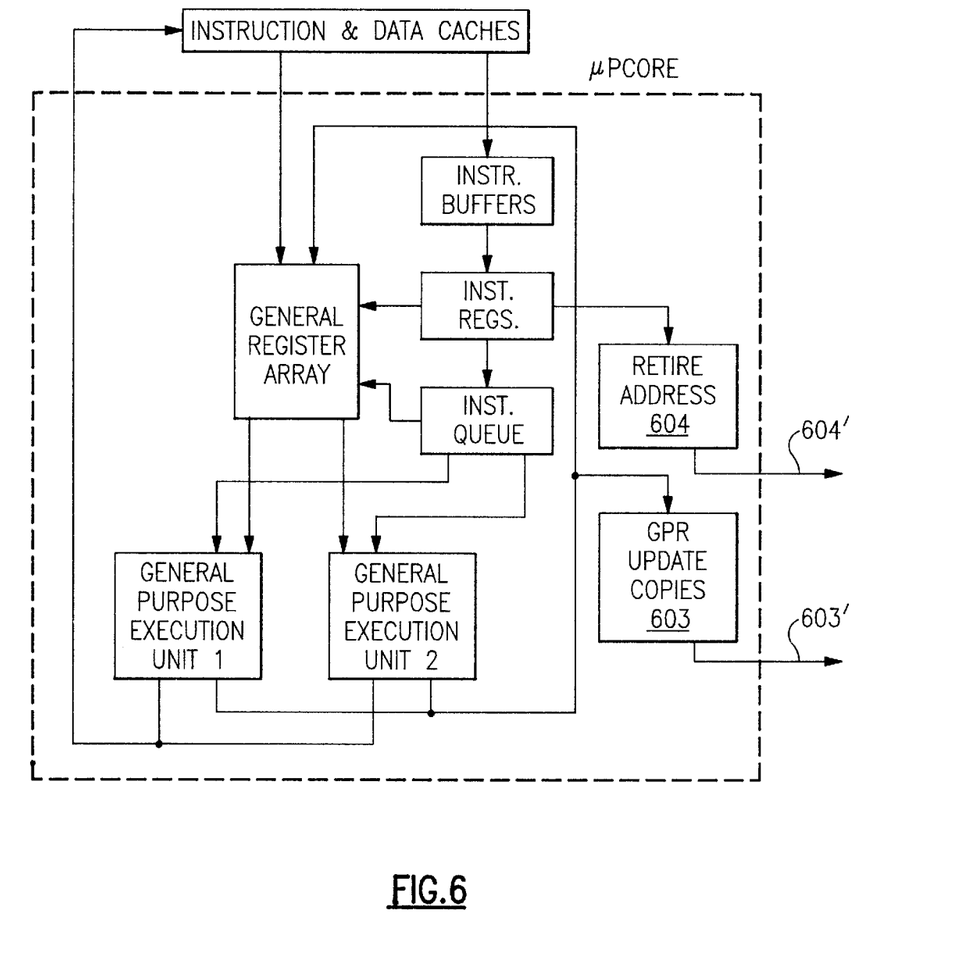
FIG. 6 shows the preferred hardware for the uPCore.

The uPCore design in the current preferred embodiment is a conventional microprocessor (one of those current superscalar designs such as the PowerPC 601 marketed by Motorola and IBM preferably, but is could be a more ancient design such as an Intel 286) It is known in the field of computer design for a system to have more than one general purpose execution unit. For example, the general purpose units may be designed along the lines of the type of function performed. Although just two such general purpose execution units are shown to be within the uPCore, the use of any number of general purpose execution units is consistent with the present invention. The uPCore portion of the invention does not require any specific alterations to a conventional microprocessor design with the exception of those shown in FIG. 6. FIG. 6 shows how the address of the most recently retired instruction is latched 604 and then driven via interface 604' to the SFE. The GPR results busses from general purpose execution units 601 and 602 are also latched 603 and then driven via its interface 603' to the SFE. The uPCore shown in FIG. 6 is an in order design but the use of any out of order design elements such as those in current commercial use as microprocessors is still consistent with the present design.

Synchronization Unit

Figure 4:
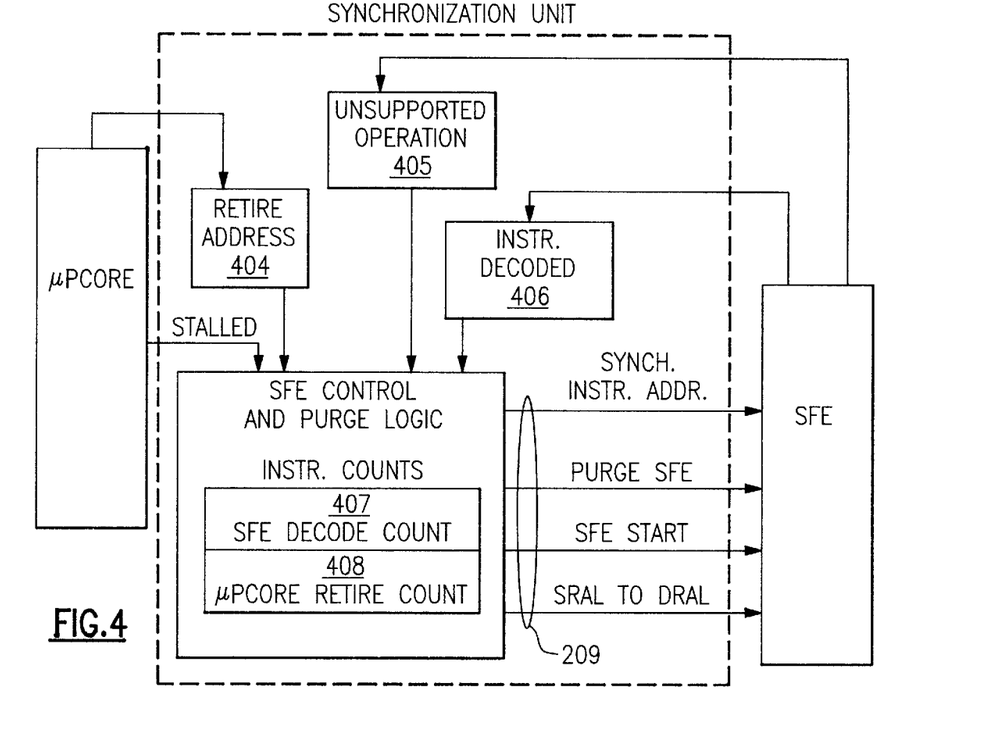
FIG. 4 shows in more detail the synchronization unit between my uPCore(s) and SFE.

The Synchronization Unit (SU 201) contains all of the logic function required to control the interaction of the uPCore and SFE. The SU is comprised of a state machine and associated input registers 404, 405 and 406. The output of the state machine is comprised of the interfaces 209 to the SFE that control the purging functions and input to the register management system. The line to the RMS controls the loading of the SRAL into the DRAL in the case of a synchronization operation.

The Synchronization Unit contains logic function which is used to determine whether the SFE is providing a prefetch benefit to the overall system. The current embodiment uses two instruction counters 408, 407 to provide this function. The first counter 408 is incremented each time the uPCore retires an instruction. The second counter 407 increments each time the SFE decodes an instruction. Both counters are reset to zero during a resynchronization operation. After resynchronization, a comparison of the counters is used to determine if the SFE has any opportunity to generate speculative fetch references that will help the uPCore. If the SFE is not decoding instructions far enough in advance of the uPCore's execution there is no possibility for benefit. A comparison of the two counters gives an imprecise but sufficient indication of the possibility for benefit as input to the specific benefit, decision point 708 of FIG. 7. The current embodiment uses a threshold value of 10 for this use. If the SFE decode count is not at least 10 greater than the uPCore retire count, the Synchronization Unit will indicate no benefit.

The Synchronization Unit also retains an indication of which uPCore the SFE is currently associated with. Each SFE has a single Synchronization Unit but each SFE can be associated with any number of uPCores. The current embodiment has one SFE associated with two uPCores.

Alternative Extensions to the Interaction of CP and SE

There are other possible extensions to the interaction of the CP and SE. An example would include having the SE update a branch prediction table that is shared by both the SE and CP. The SE could also provide the CP hints about potential instruction exceptions or other conditions that might allow the CP to avoid pipeline disruption. The instruction and operand data fetched in response to SFE fetch requests may be forwarded directly to the uPCore. The data will therefore be closer to the uPCore general purpose execution units and instruction decoding logic in the case that the speculative requests are accurate. This may further reduce the finite cache penalty in some implementations.

While we have described our preferred embodiments of our invention, it will be understood that those skilled in the art, both now and in the future, may make various improvements and enhancements which fall within the scope of my development.

Those who make various improvements will appreciate that my performance analysis has showed that out of order (or sequence) execution provides greater benefit in the reduction of finite L1 cache CPI as compared to reduction of infinite L1 cache CPI. Current technology trends show that finite cache effects are growing quickly, thereby causing the finite L1 CPI benefit to become far greater than the infinite L1 CPI benefit.

My provision, which I have detailed, of a speculative fetch engine (SFE) supporting a core microprocessor, and their interaction in concert with the core microprocessor maintaining the architectural state of concerted action while allowing speculative memory references to a storage hierarchy shared by both the SFE and microprocessor core (uPCore) will benefit those who wish to obtain a significant simplification to prior art designs which use out of order execution or to make a significant performance improvement to prior art designs which do not use out of order execution. Ideally, the invention enables a better optimization of the design tradeoffs related to the use of out of order execution in the pursuit of increased system performance. The invention enables a microprocessor design to be optimized for high frequency, low complexity and low infinite L1 cache CPI without adding too much out of order execution complexity to the main pipeline, as opposed to the increasingly deep stages employed in some of the more current designs.

At the same time, the coprocessor can use out of order execution techniques to a much larger extent in the pursuit of a reduction in finite cache effects for both the microprocessor and coprocessor. The complexity of out of order execution in the coprocessor is mitigated by the fact that the coprocessor does not need to support the full set of architected instructions or the full set of exceptions and interruptions associated with instruction execution. These claims following should be construed to encompass further improvements and to maintain the proper protection for the invention first disclosed.

What is claimed is:

1. A computer system having a hierarchical memory with cache storage for instructions and data, comprising,
    at least one conventional processing element for processing instructions with at least one instruction pipeline of a defined length and defined delay per pipeline stage;
    and an additional speculative engine processing element for processing instructions, including out-of-order instructions, for instruction sequences which derive finite cache improvement from out-of-order processing, wherein
    said additional speculative engine processing element and said conventional processing element are coupled for action in concert to process a stream of instructions with said conventional processing element maintaining the architectural state of concerted action with its pipeline handles while said speculative engine processing element handles speculative processes whose result may not change the architectural state of the computer system but which improves the finite cache penalty seen by said conventional processing element, and wherein said speculative processing element includes m registers in a central processing area, m being greater than a predetermined n number of instruction addressable GPRs identified by one or more binary fields of an instruction, and provision for out of order instruction execution and for processing a conditional branch instruction based on a branch direction guess, said conventional processing element being coupled to a coprocessor providing said additional speculative engine processing element for independent prefetching and execution of instructions to improve the sequence of storage references as seen by said conventional processing element,
    said system using a register management process enabling generation of speculative memory references to said storage hierarchy including said instruction and data cache coupled to and shared by both said additional speculative engine processing element and said conventional processing element, and further including,
    an instruction and data cache coupled to both said conventional out of order processing element and to said coprocessor providing said additional speculative engine processing element for fetching instructions and data, and an independent store buffer for bidirectional transfer of instructions and data in response to store and fetch commands of said additional speculative engine processing element.

2. A computer system according to claim 1 further including,
    a synchronization unit coupled to both said conventional processing element and to said coprocessor providing said additional speculative engine processing element for synchronization of said conventional processing element with said additional speculative engine processing element.

3. A computer system according to claim 1 wherein said additional speculative engine processing element generates store references which are not sent to the instruction and data caches and are instead sent to the store buffer to be made available to subsequent instructions executed on said additional speculative engine processing element without altering the architectural state of said conventional out of order processing element and said instruction and data caches, all additional speculative engine processing element stores being made to said independent store buffer.

4. A computer system according to claim 3 wherein a speculative coprocessor cache miss is experienced if both the caches and the store buffer do not have desired data, while instructions and operands are returned to the additional speculative engine processing element over a first interface in the case where there is no relevant entry in the store buffer, and are returned over a second interface if there is a relevant entry in the store buffer.

5. A computer system according to claim 1 further including,
    a GPR interface between the general purpose architectural registers of said conventional out of order processing element for carrying updates of said conventional out of order processing element to said additional speculative engine processing element over said GPR interface.

6. A computer system according to claim 1 further including,
    a register management system having synchronization register assignment lists for synchronizing the pipeline stages of said conventional processing element and additional speculative engine processing element over said GPR interface.

7. A computer system according to claim 1 wherein stores to the memory hierarchy from said additional speculative engine processing element over said GPR interface are sent to its store buffer and not to the instruction and data caches.

8. A computer system according to claim 1 wherein stores to the memory hierarchy from said additional speculative engine processing element over said GPR interface are sent to its store buffer and not to the instruction and data caches, and wherein is provided an GPR interface between the general purpose architectural registers of said conventional processing element for carrying updates of said conventional out of order processing element to said additional speculative engine processing element over said GPR interface and a register management system having synchronization register assignment lists for synchronizing the pipeline stages of said conventional processing element and additional speculative engine processing element over said GPR interface.

9. A computer system according to claim 1 wherein said additional speculative engine processing element has an instruction pipeline of one or more pipelines of a defined length and defined delay per pipeline stage for processing instructions, and said conventional processing element has fewer pipeline stages than said speculative engine processing element but there is an equal delay for each stage of the pipeline for instruction sequences which do not derive finite cache improvement from out of order processing by said additional speculative engine processing element.

10. A computer system according to claim 1 wherein said conventional processing element has for processing instructions, an instruction pipeline of one or more pipelines of a defined length and defined delay per pipeline stage and said conventional processing element has fewer pipeline stages than said speculative engine processing element coprocessor but there is an equal delay for each stage of the pipeline for instruction sequences which do not derive finite cache improvement from out of order processing by said additional speculative engine processing element.

11. A microprocessor having a hierarchical memory with cache storage for instructions and data, comprising, at least one conventional processing element for processing instructions with multiple pipelines of a defined length and defined delay per pipeline stage;

and an additional speculative engine processing element for processing instructions, including out-of-order instructions, for instruction sequences which derive finite cache support from out-of-order processing, wherein said additional speculative engine processing element and said conventional processing element are coupled for action in concert to process a stream of instructions with said conventional processing element maintaining the architectural state of concerted action with its pipeline handles while said speculative engine processing element handles speculative processes whose result may not change the architectural state of the computer system but which improves the finite cache penalty seen by said conventional processing element with register management and synchronization of said multiple pipelines, and further including, an instruction and data cache coupled to both said conventional out of order processing element and to said coprocessor providing said additional speculative engine processing element for fetching instructions and data, and an independent store buffer for bidirectional transfer of instructions and data in response to store and fetch commands of said additional speculative engine processing element.

\* \* \* \* \*